United States Patent
Puri et al.

(10) Patent No.: US 10,686,969 B2
(45) Date of Patent: Jun. 16, 2020

(54) DETECTING SHOT CHANGES IN A VIDEO

(71) Applicant: NETFLIX, INC., Los Gatos, CA (US)

(72) Inventors: Rohit Puri, Campbell, CA (US); Adithya Prakash, Campbell, CA (US); Shinjan Tiwary, San Jose, CA (US)

(73) Assignee: NETFLIX INC., Los Gatos, CA (US)

(*) Notice: Subject to any disclaimer, the term of this patent is extended or adjusted under 35 U.S.C. 154(b) by 519 days.

(21) Appl. No.: 15/379,318

(22) Filed: Dec. 14, 2016

(65) Prior Publication Data
US 2018/0013932 A1    Jan. 11, 2018

Related U.S. Application Data

(60) Provisional application No. 62/360,286, filed on Jul. 8, 2016.

(51) Int. Cl.
| | |
|---|---|
| *H04N 5/14* | (2006.01) |
| *H04N 19/87* | (2014.01) |
| *H04N 21/234* | (2011.01) |
| *H04N 21/44* | (2011.01) |
| *H04N 19/142* | (2014.01) |

(52) U.S. Cl.
CPC .......... *H04N 5/147* (2013.01); *H04N 19/142* (2014.11); *H04N 19/87* (2014.11); *H04N 21/23418* (2013.01); *H04N 21/44008* (2013.01)

(58) Field of Classification Search
None
See application file for complete search history.

(56) References Cited

U.S. PATENT DOCUMENTS

| | | |
|---|---|---|
| 8,358,381 B1 | 1/2013 | Diard |
| 2003/0185442 A1 | 10/2003 | Yang et al. |
| 2007/0074266 A1* | 3/2007 | Raveendran ........... H04N 5/144 725/135 |
| 2010/0039565 A1* | 2/2010 | Seeling ................. H04N 5/147 348/702 |
| 2010/0277650 A1* | 11/2010 | Matsuzaki ......... A61B 1/00009 348/700 |
| 2017/0053187 A1* | 2/2017 | Li ......................... G06K 9/6215 |
| 2018/0007444 A1* | 1/2018 | Li ......................... G11B 27/102 |

FOREIGN PATENT DOCUMENTS

WO    2007/047758 A1    4/2007

OTHER PUBLICATIONS

International Search Report and Written Opinion for PCT Application No. PCT/US2017/040919 dated Sep. 18, 2017, 14 pages.

* cited by examiner

*Primary Examiner* — James M Anderson, II
(74) *Attorney, Agent, or Firm* — Artegis Law Group, LLP

(57) ABSTRACT

One embodiment of the present invention sets forth a technique for detecting a shot change in a video. The technique includes calculating a first plurality of difference values for pixel blocks included in a first video frame and a second video frame and calculating a first cumulative distribution function (CDF) based on the first plurality of difference values. The technique further includes calculating a second plurality of difference values for pixel blocks included in a first plurality of video frames that is contiguous with the first video frame and calculating a second CDF based on the second plurality of difference values. The technique further includes comparing the first CDF to the second CDF to detect a shot change.

20 Claims, 10 Drawing Sheets

DETECTING SHOT CHANGES IN A VIDEO

CROSS-REFERENCE TO RELATED APPLICATIONS

This application claims benefit of the United States provisional patent application having Ser. No. 62/360,286, filed Jul. 8, 2016. The subject matter of this related application is hereby incorporated herein by reference.

BACKGROUND OF THE INVENTION

Field of the Invention

Embodiments of the present invention relate generally to audiovisual processing and, more particularly, to detecting shot changes in a video.

Description of the Related Art

Streaming digitally encoded audiovisual (AV) programs, such as feature length films and television programs, over the Internet has become increasingly popular as the availability of high-bandwidth Internet connections has expanded. Streaming media services typically include a content server, a content player, and a communications network connecting the content server to the content player. The content server is configured to store media files (or "streams") made available to end-users. Each media file may provide a digital version of a movie, a television program, a sporting event, a staged or live event captured by recorded video, etc.

Oftentimes, when generating streaming media content and other types of content, the audiovisual material is analyzed and indexed as part of a post-production process in order to break the material into segments commonly referred to as "shots." Each shot generally includes a continuous sequence of video frames that were recorded via a single camera. In order to break audiovisual material into different shots, it is often necessary to analyze the material to detect transitions between different shots, commonly referred to as "shot changes." The different shots can then be processed for various purposes, including subtitle generation, content-based indexing, and video encoding.

A common technique for detecting shot changes relies on generating histograms for consecutive video frames and comparing the histograms to detect differences. Such techniques are based on the assumption that, if two consecutive video frames have similar histograms, then the video frames are likely to belong to a single, continuous shot. If, on the other hand, two consecutive video frames have substantially different histograms, then the video frames are likely to belong to different shots. Another common technique relies on comparing consecutive video frames, block by block, in order to compute the sum of the differences between the video frames. In such techniques, a shot change is detected when the sum of the differences between corresponding blocks in the video frames is above a certain level. However, each of these techniques has drawbacks.

In particular, techniques that compare histograms are unable to accurately detect spatial differences between video frames that have similar luminance and color values. For example, if, in a particular video frame, an object having a particular size, color, and brightness is in a first position within the video frame and, in the next video frame, a different object having a similar size, color, and brightness is in a different position within the video frame, the resulting histograms will look similar. Consequently, under such circumstances, histogram-based techniques will often fail to detect a shot change.

Further, although shot change detection techniques that compare sum of difference values between consecutive video frames are better able to detect shot changes, such techniques often generate a high number of false positives. For example, such techniques commonly generate a false positive when the lighting changes significantly between consecutive video frames, such as when the headlights of a car are turned on in a dark movie scene. In this particular example, although the sum of differences between the video frames is high, the video frames are, in fact, part of a single, continuous shot. As a result, this type of shot change detection technique typically has a high recall (i.e., a measure of the number of accurately detected shot changes in a video as a function of the actual number of shot changes in the video), but relatively low precision (i.e., a measure of the number of accurately detected shot changes in a video as a function of the total number of shot changes detected in the video, including false positives).

As the foregoing illustrates, what is needed in the art are more effective techniques for detecting shot changes in videos.

SUMMARY OF THE INVENTION

One embodiment of the present invention sets forth a method for detecting a shot change. The method includes calculating a first plurality of difference values for pixel blocks included in a first video frame and a second video frame and calculating a first cumulative distribution function (CDF) based on the first plurality of difference values. The method further includes calculating a second plurality of difference values for pixel blocks included in a first plurality of video frames that is contiguous with the first video frame and calculating a second CDF based on the second plurality of difference values. The method further includes comparing the first CDF to the second CDF to detect a shot change.

Further embodiments provide, among other things, a non-transitory computer-readable medium and a computing device configured to implement the method set forth above.

At least one advantage of the disclosed techniques is that shot changes can be detected deterministically, in both a forward direction and reverse direction, with respect to a particular sequence of video frames. Additionally, the techniques described herein are able to more precisely detect shot changes that occur between video frames having similar luminance and/or color values, but different spatial characteristics. Further, the techniques described herein are able to avoid false positives that may otherwise occur due to sudden lighting changes that occur within a single, continuous shot.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
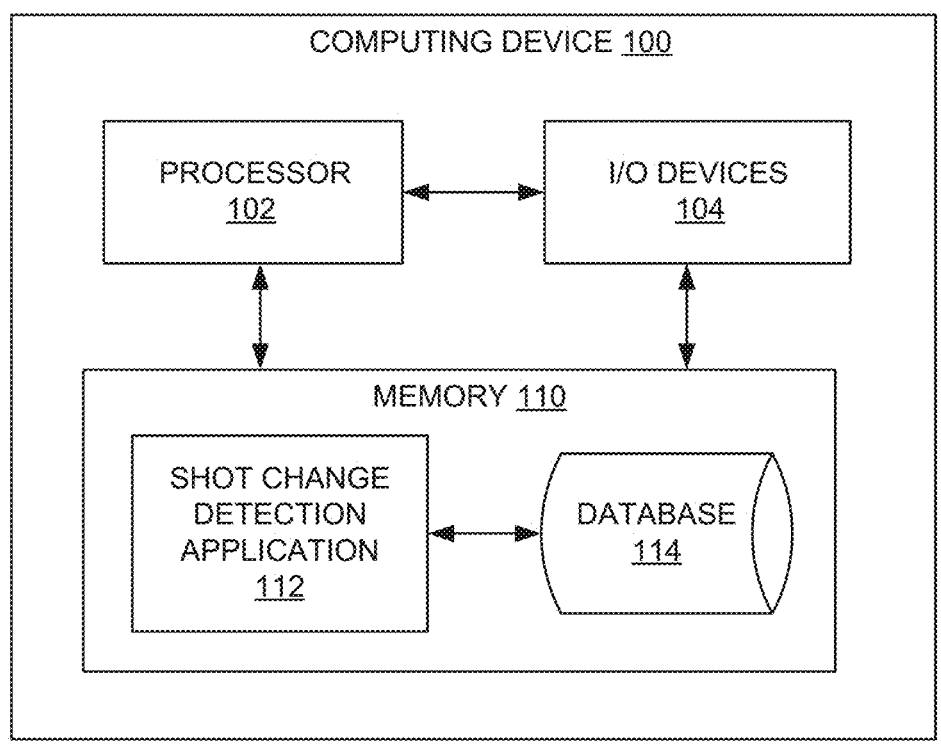
FIG. 1 illustrates a conceptual block diagram of a computing device configured to implement one or more aspects of the present invention.

FIG. 1 illustrates a conceptual block diagram of a computing device 100 configured to implement one or more aspects of the present invention. As shown, the computing device 100 includes a processor 102, input/output (I/O) devices 104, and a memory 110. The memory 110 includes a shot change detection application 112 configured to interact with a database 114.

The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. The shot change detection application 112 within memory 110 is executed by the processor 102 to implement the overall functionality of the computing device 100. For example, and without limitation, video frames included in video content may be analyzed by the shot change detection application 112 to determine one or more differences values and/or to generate and compare distribution functions in order to detect shot changes within a video. The processing performed by the shot change detection application 112 may include, for example, and without limitation, image filtering, motion estimation, statistical analysis, and/or other types of image and video processing. Database 114 within memory 110 may include difference values, distribution functions, algorithms, video frames, video codecs, and/or other types of data associated with video frames. Generally, shot change detection application 112 is configured to coordinate the overall operation of the computing device 100. However, the embodiments disclosed herein contemplate any technically feasible system configured to implement the functionality of the computing device 100.

I/O devices 104 may include input devices, output devices, and devices capable of both receiving input and providing output. For example, and without limitation, I/O devices 104 could include human interface devices and wired and/or wireless communication devices that send data to and/or receive data from the computing device 100.

As noted above, conventional techniques for detecting shot changes in a video suffer from a number of drawbacks. In particular, techniques that rely on detecting differences between the histograms of consecutive video frames are unable to accurately detect spatial differences between video frames that, as a whole, have similar luminance and/or color values. Further, techniques that rely on comparing the sum of differences between consecutive video frames often generate a high number of false positives, for example, when the lighting changes significantly between consecutive video frames included in a single shot.

Various embodiments described below overcome these and other deficiencies of conventional approaches for detecting shot changes in a video. Specifically, in various embodiments, the shot change detection application 112 performs motion estimation on pixel blocks included in a current video frame and a previous video frame in order to calculate a plurality of differences values. The shot change detection application 112 then generates a histogram based on the difference values calculated for the pixel blocks. Next, the shot change detection application 112 generates a cumulative distribution function (CDF) based on the histogram. The CDF generally reflects the percentage of difference values computed for the current video frame that exist below a specified difference value.

In a similar manner, the shot change detection application 112 calculates differences values for one or more previous video frames and one or more subsequent videos frames. The shot change detection application 112 then generates two additional histograms—one histogram for the one or more previous video frames and one histogram for the one or more subsequent video frames. Next, the shot change detection application 112 generates a different CDF for each of the additional histograms. Finally, the CDF associated with the current video frame is compared to the CDFs associated with the one or more previous video frames and the one or more subsequent video frames in order to determine whether a shot change exists between the current video frame and the previous video frame.

Based on these techniques, the shot change detection application 112 is able to deterministically detect shot changes in both a forward direction and reverse direction with respect to a particular sequence of video frames. Additionally, the techniques described herein more accurately identify statistically significant changes between a current frame and the previous frame. Accordingly, the shot change detection application 112 is able to more precisely detect shot changes that occur between video frames having similar luminance and/or color values, but different spatial characteristics. Further, the shot change detection application 112 is able to avoid false positives that may otherwise occur due to sudden lighting changes that occur within a single, continuous shot.

The techniques disclosed herein are motivated, in part, by the observation that video is "local phenomenon." That is, statistics associated with a video vary gradually over time. Further, because shot change detection is a symmetric problem, an effective shot change detection technique should provide the same results when analyzing a sequence of video frames in either a forward or reverse direction. Examples of such techniques are described below in further detail in conjunction with FIGS. 3A-3D and 4-7.

Figure 2:
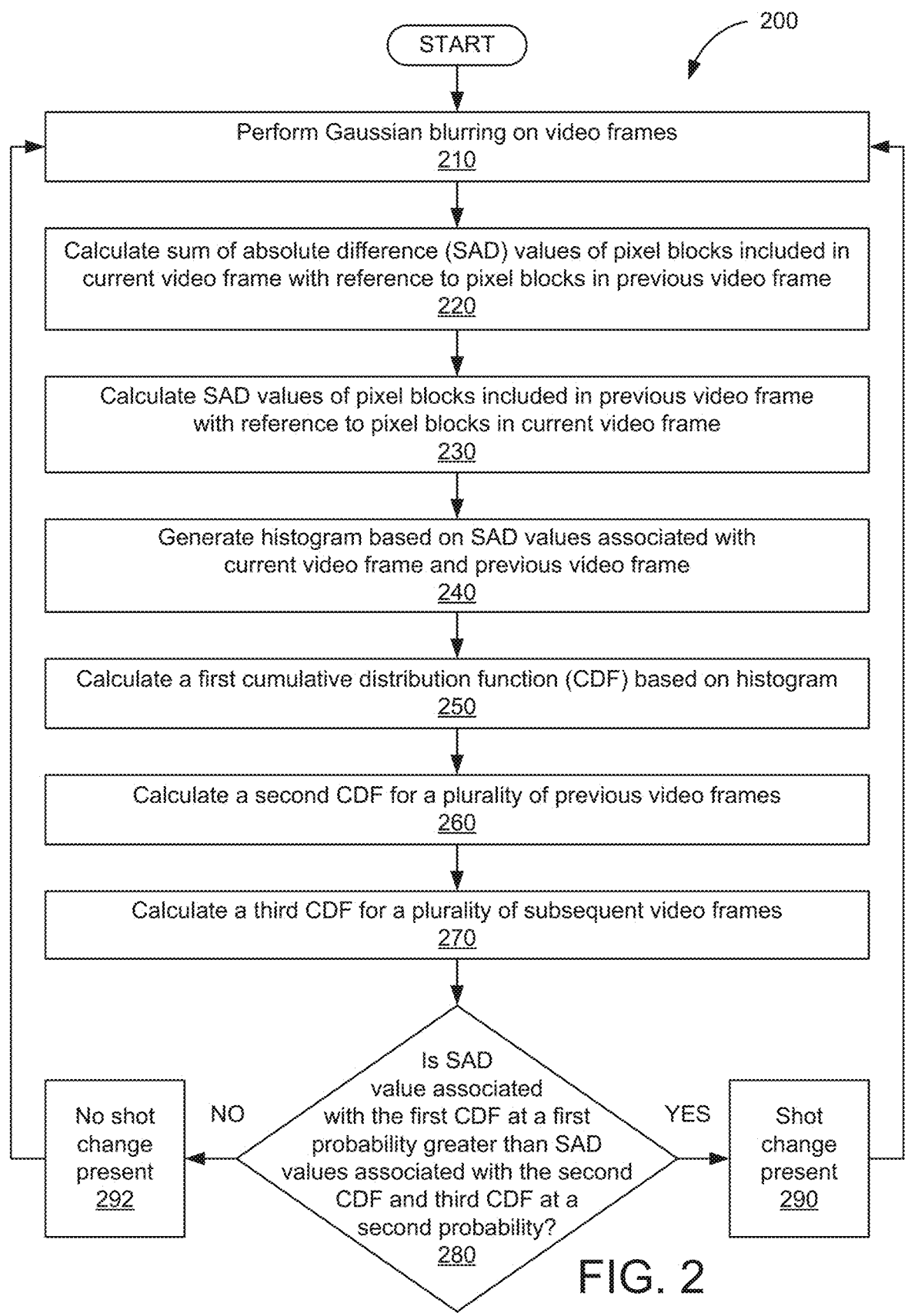
FIG. 2 illustrates a flow diagram of method steps for detecting a shot change in a video, according to various embodiments of the present invention.

FIG. 2 illustrates a flow diagram of method steps for detecting shot changes in a video, according to various embodiments of the present invention. Although the method steps are described in conjunction with the system of FIG. 1, persons skilled in the art will understand that any system configured to perform the method steps, in any order, falls within the scope of the present invention.

As shown in FIG. 2, a method 200 begins at step 210, where the shot change detection application 112 applies a blur filter to video frames that are being analyzed to detect a shot change. In various embodiments, applying a blur filter removes random noise that may interfere with statistical analysis and results. In general, because shot change is a macro phenomenon, smoothing out the video frames by applying a blur filter prevents unimportant details from significantly affecting the statistical analysis, while preserving the overall structure of a video frame.

Figure 3A:
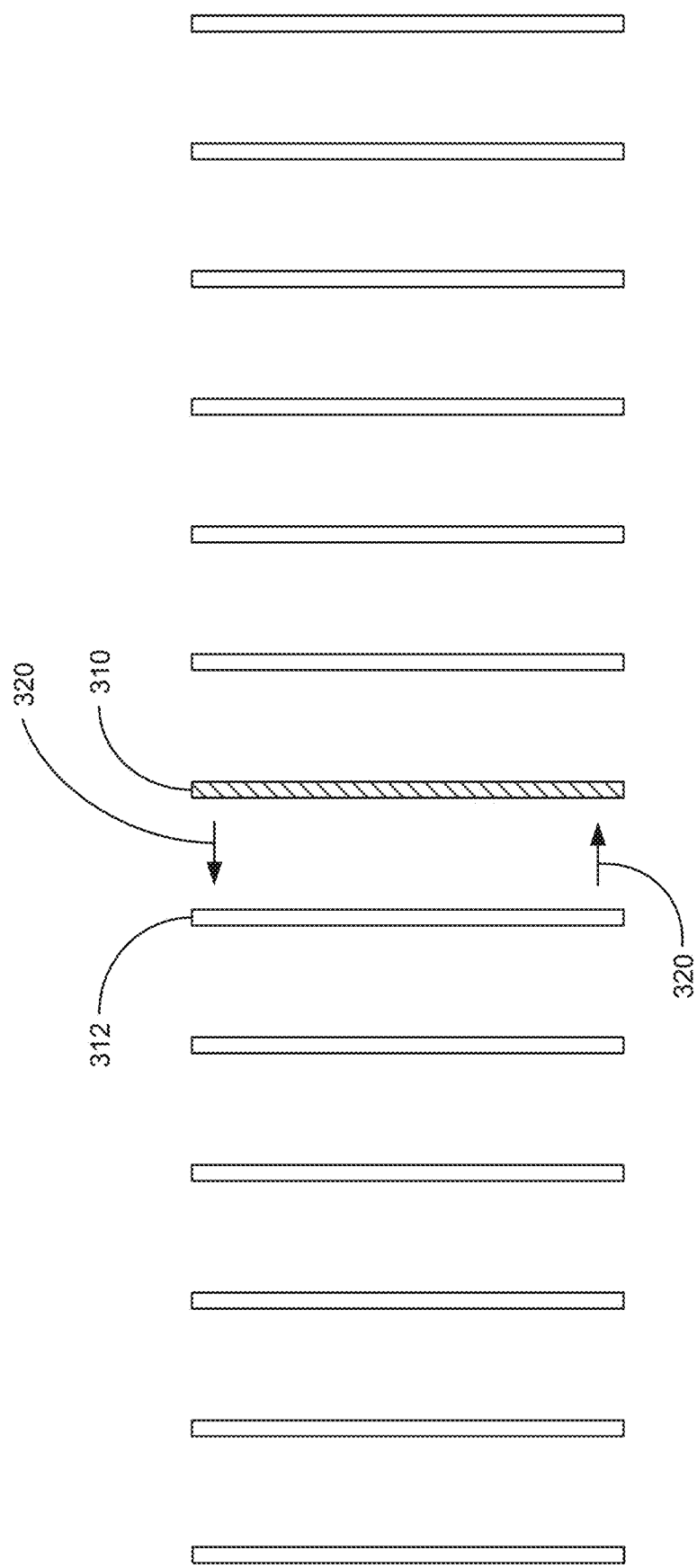
FIG. 3A illustrates a sequence of video frames for which difference values are computed, according to various embodiments of the present invention.

In some embodiments, at step 210, the shot change detection application 112 performs Gaussian blurring on each video frame included in a sequence of video frames that are to be processed by the shot change detection application 112. For example, as shown in FIG. 3A, shot change detection application 112 could perform Gaussian blurring on a sequence of video frames that includes a current video frame 310 and a previous video frame 312.

Next, at step 220, the shot change detection application 112 calculates a plurality of difference values between pixel blocks included in the current video frame 310 with reference to the previous video frame 312. In some embodiments, the shot change detection application 112 calculates a plurality of difference values for the video frames 310, 312 after a blur filter has been applied to the video frames 310, 312, as described above. In some embodiments, at step 220, the shot change detection application 112 calculates a plurality of sum of absolute difference (SAD) values for the current video frame 310 by performing motion estimation 320 on pixel blocks included in the current video frame 310. However, in any of the embodiments described herein, any other type of difference values (e.g., cross correlations, mean squared distance, etc.) could be implemented by the shot change detection application 112 to detect shot changes.

Figure 3B:
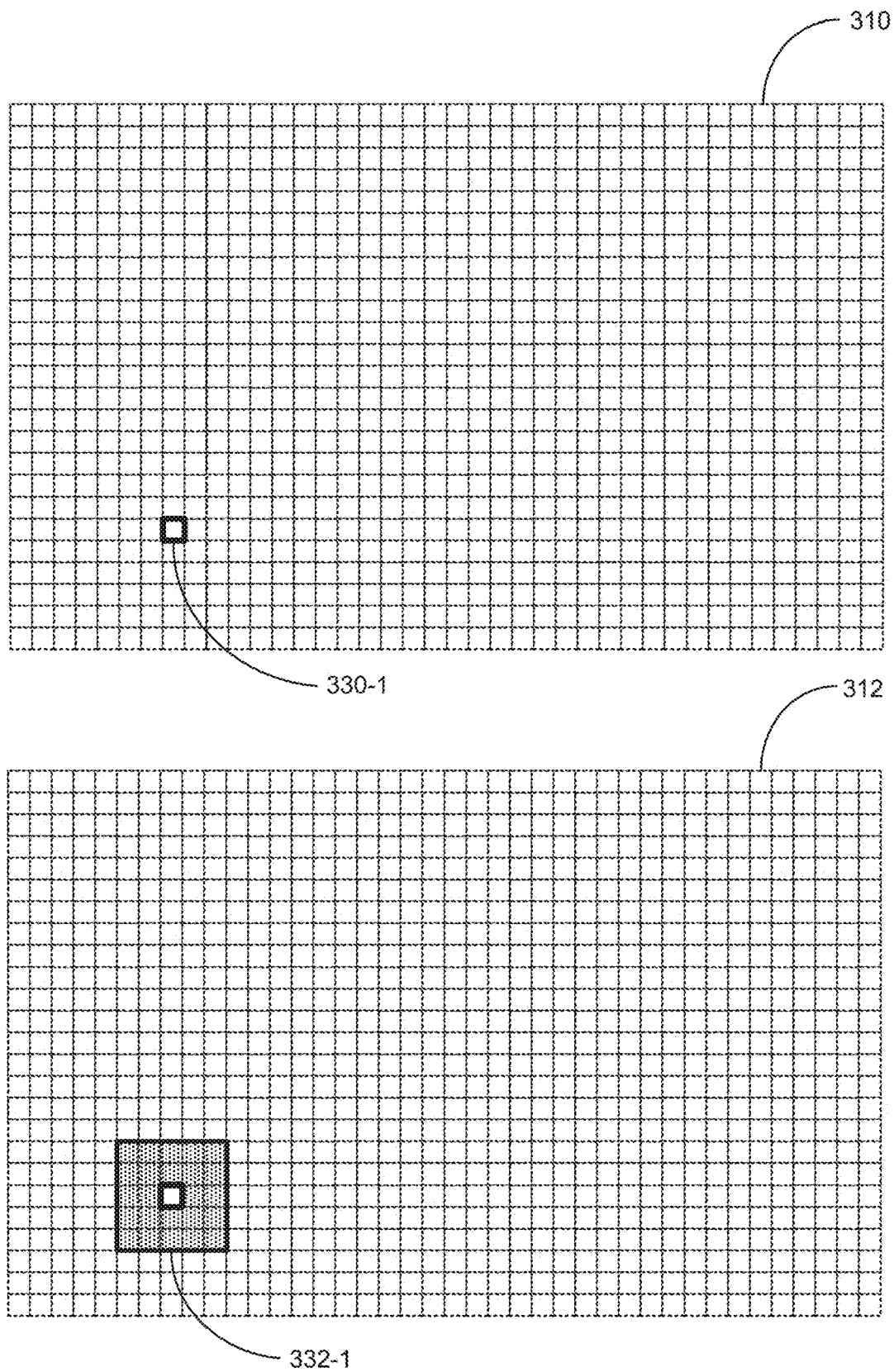
FIGS. 3B and 3C illustrate a technique for performing motion estimation with respect to a current video frame and a previous video frame, according to various embodiments of the present invention.

For example, as shown in FIG. 3B, at step 220, the shot change detection application 112 could perform motion estimation 320 on each pixel block 330 included in the current video frame 310 with reference to a search range 332 within the previous video frame 312. In some embodiments, each pixel block may have dimensions of 8×8 pixels, 16×16 pixels, 32×32 pixels, 64×64 pixels, or any other suitable dimensions. Further, although the video frames 310, 312 shown in FIG. 3B are divided into 1,000 pixel blocks, in other embodiments, each video frame may be divided into any number of pixel blocks.

In some embodiments, the shot change detection application 112 may calculate SAD values based only on luminance values associated with a video frame, or the shot change detection application 112 may calculate SAD values based on luminance and/or chroma values associated with a video frame. In addition, SAD values may be generated based on any other color space (e.g., RGB) implemented by video frames. Additionally, the shot change detection application 112 may implement any search range 332 and any type of motion vectors when performing motion estimation 320 to calculate SAD values.

Figure 3C:
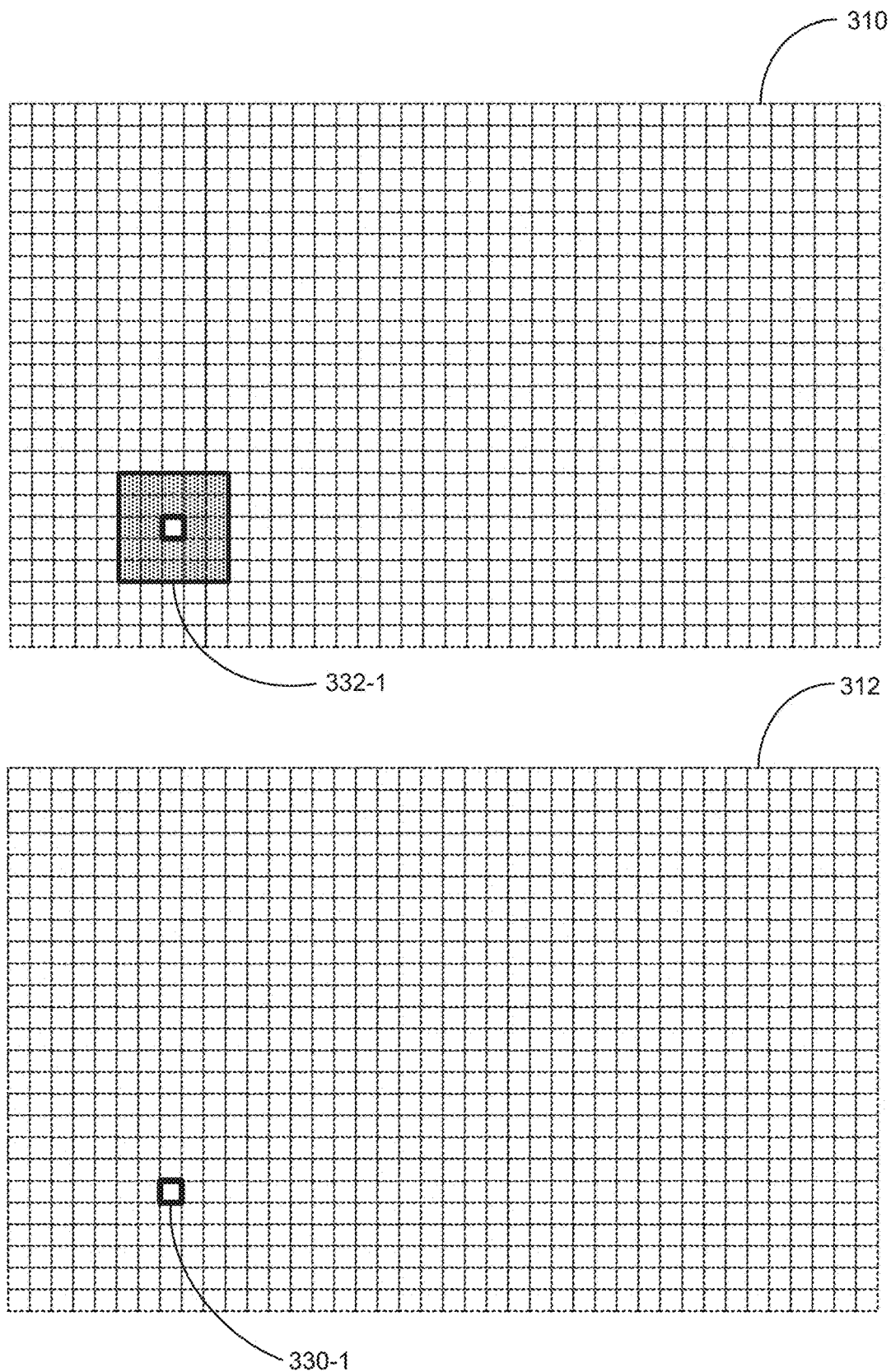

With further reference to the example shown in FIG. 3B, at step 220, the shot change detection application 112 would calculate 1,000 SAD values, one for each pixel block 330 included in the current video frame 310. Then, at step 230, the shot change detection application 112 performs the same process for the previous video frame 312. Specifically, at step 230, the shot change detection application 112 calculates a plurality of difference values between pixel blocks included in the previous video frame 312 with reference to the current video frame 310. For example, as shown in FIG. 3C, at step 230, the shot change detection application 112 could perform motion estimation 320 on each pixel block 330 included in the previous video frame 312 with reference to a search range 332 within the current video frame 310, resulting in an additional 1,000 SAD values.

By calculating a difference value for each pixel block 330 included in the current video frame 310 with reference to the previous video frame 312 as well as calculating a difference value for each pixel block 330 included in the previous video frame 312 with reference to the current video frame 310, the statistical analysis performed by the shot change detection application 112 is temporally symmetric. That is, the shot change detection results generated by the shot change detection application 112 will be the same regardless of the direction in which a particular sequence of video frames is analyzed.

This temporally symmetric approach enables the shot change detection application 112 to detect shot changes that may not be detected by conventional approaches. As an example, with reference to a movie scene which includes a shot change that transitions from an all dark video frame to a video frame that includes a small campfire burning in an otherwise dark scene, performing shot detection in a forward direction may not detect that a shot change has occurred. Specifically, in conventional approaches, motion estimation would implement only pixel blocks included in the all dark video frame as search criteria. Consequently, assuming that a moderate search range is implemented, each dark pixel block included in the all dark video frame would be matched to a dark pixel block that is included in the corresponding search range of the subsequent video frame. As a result, conventional approaches would not detect the presence of the small campfire in the subsequent video frame.

By contrast, the temporally symmetric approach implemented by the shot change detection application 112 further calculates difference values in the reverse direction. For example, the shot change detection application 112 could perform motion estimation 320 based on pixel blocks included in the video frame—some of which include the small campfire—with reference to the all dark video frame. Accordingly, the shot change detection application 112 would calculate higher SAD values for pixel blocks that correspond to the portion of the video frame that includes the small campfire. That is, because pixel blocks that include the campfire are implemented by the shot change detection application 112 as search criteria, higher SAD values will be calculated for these pixel blocks, enabling the shot change detection application 112 to detect a shot change.

Figure 3D:
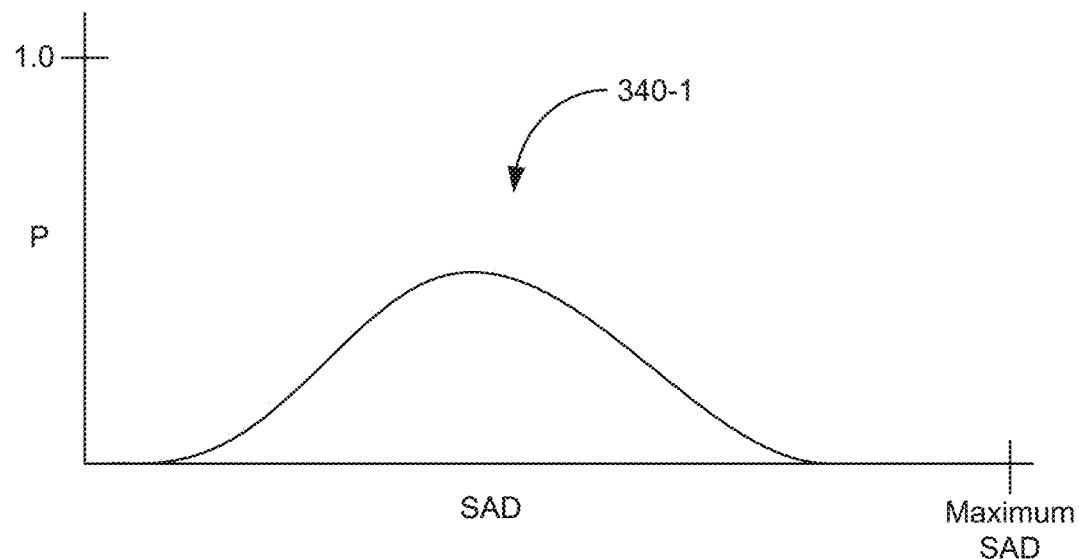
FIG. 3D illustrates a probability distribution function (PDF) generated based on difference values associated with a current video frame, according to various embodiments of the present invention.

At step 240, the shot change detection application 112 generates a histogram based on the 2,000 SAD values calculated at steps 220 and 230. The shot change detection application 112 may further scale the histogram to generate a probability distribution function (PDF) 340-1, as shown in FIG. 3D. The PDF 340-1 includes a maximum SAD value that corresponds to the maximum sum of differences that can occur between two pixel blocks. In embodiments that implement pixel blocks 330 having a dimension of 32×32 pixels and calculate SAD values based on 8-bit luminance values included in the pixel blocks 330, the maximum SAD value may be 32×32×255, or 261,120. As noted above, other pixel block dimensions, pixel values, and/or color spaces may be implemented by the shot change detection application 112 to calculate SAD values.

In some embodiments, at step 240, the shot change detection application 112 generates a smooth PDF 340-1 that represents that probability that a given pixel block 330 is assigned a given SAD value. In other embodiments, prior to generating a histogram, the shot change detection application 112 bins the 2,000 SAD values based on SAD value intervals. For example, the shot change detection application 112 could bin SAD values in different bins that correspond to any technically feasible interval, such as 10 units, 100 units, 500 units, 1,000 units, 2,000 units, etc. In a specific example, the shot change detection application 112 could bin SAD values that correspond to 8-bit luminance values included in 32×32 pixel blocks in different bins that correspond to 1,000 unit intervals, resulting in approximately 261 different bins. The shot change detection application 112 could then generate a PDF 340-1 based on the 261 different bins.

Figure 3E:
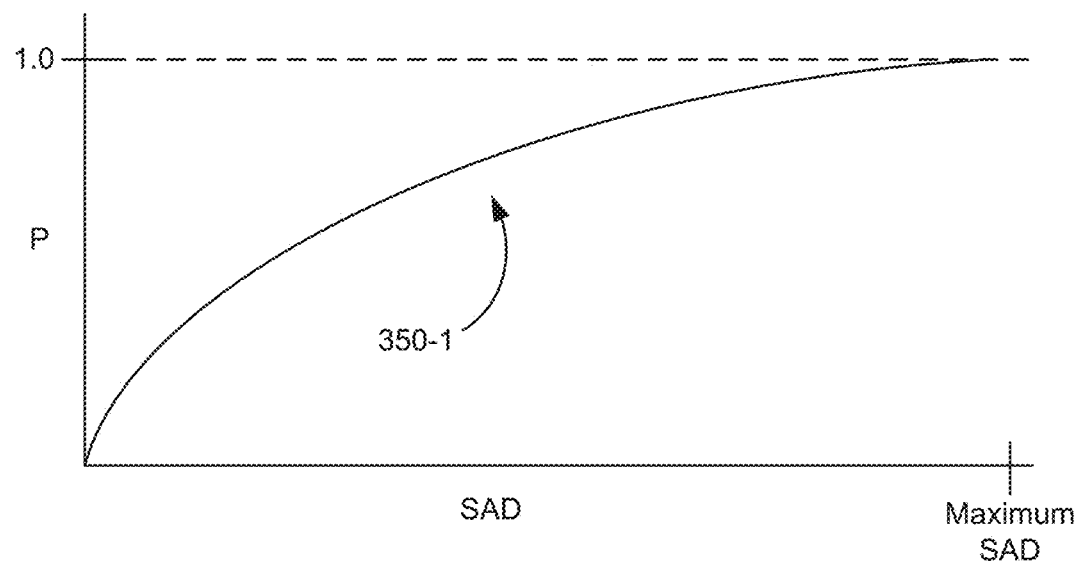
FIG. 3E illustrates a cumulative distribution function (CDF) generated based on difference values associated with a current video frame, according to various embodiments of the present invention.

Next, at step 250, the shot change detection application 112 calculates a cumulative distribution function (CDF) 350-1 for the current video frame 310, as shown in FIG. 3E. For example, the shot change detection application 112 could calculate the CDF 350-1 by integrating the PDF 340-1 that was generated at step 240. The CDF 350-1 for the current video frame 310 reflects the percentage of SAD values included in the current video frame 310 that are below a given SAD value.

Figure 4:
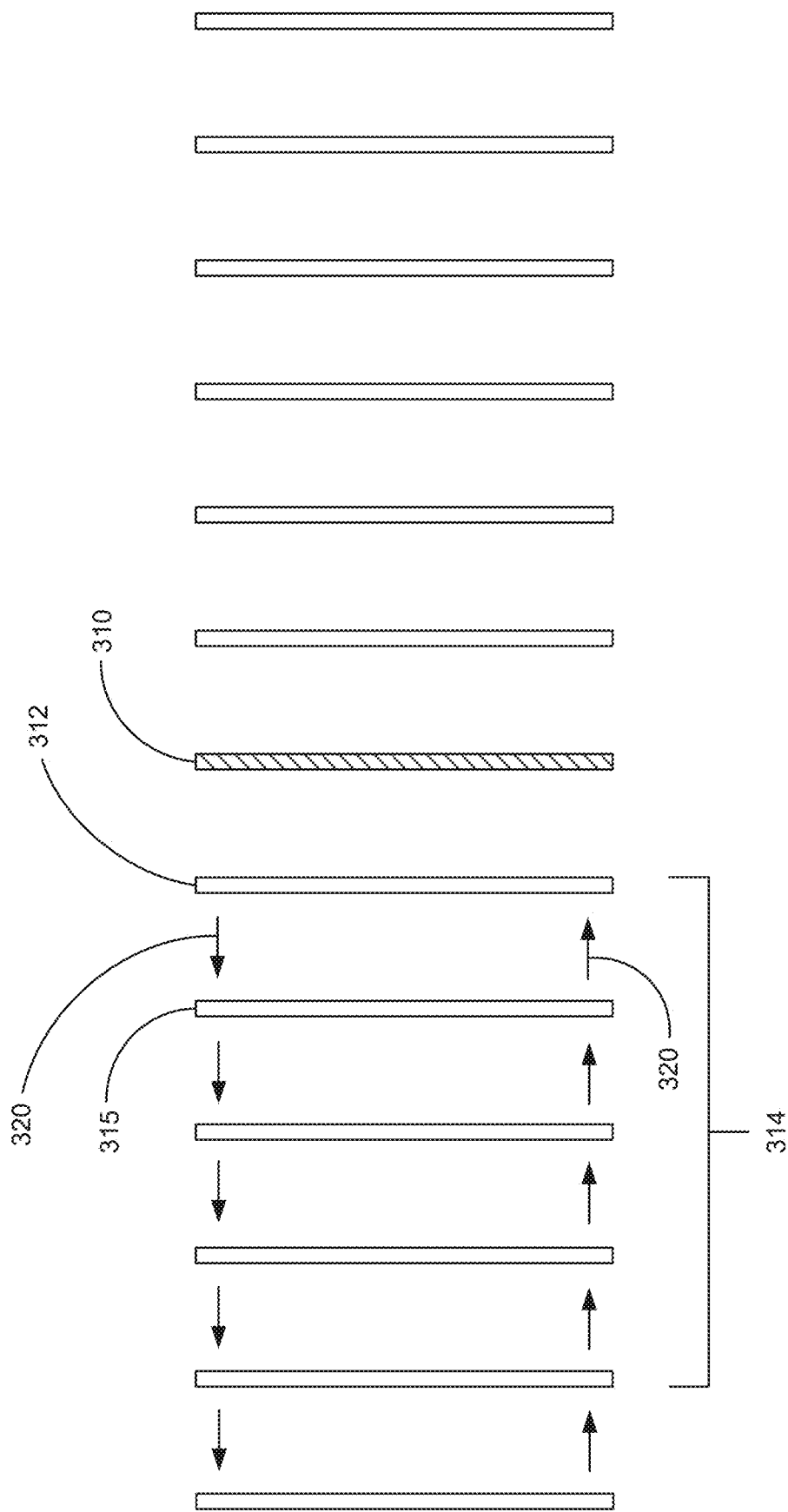
FIG. 4 illustrates a technique for generating a CDF for a set of video frames that occur before a current video frame, according to various embodiments of the present invention.

At step 260, the shot change detection application 112 calculates a CDF 350-2 for one or more video frames that occur before the current video frame 310. In some embodiments, the shot change detection application 112 calculates a CDF 350-2 for the five video frames 314 that occur before the current video frame 310, including the previous video frame 312, as shown in FIG. 4. Specifically, at step 260, the shot change detection application 112 performs steps 220 and 230 for each video frame included in the one or more video frames, with reference to the previously occurring video frame.

For example, as shown in FIG. 4, the shot change detection application 112 could perform steps 220 and 230 for video frame 312 by performing motion estimation with reference to video frame 315. The shot change detection application 112 could further perform steps 220 and 230 for video frame 315 by performing motion estimation with reference to the previously occurring video frame, and so on, until SAD values have been calculated for all five video frames 314. Accordingly, in such embodiments, the shot change detection application 112 could calculate ten additional sets of 1,000 SAD values for a total of 10,000 SAD values. The shot change detection application 112 would then generate a histogram, a PDF 340-2, and then a CDF 350-2 based on the 10,000 SAD values.

Figure 5:
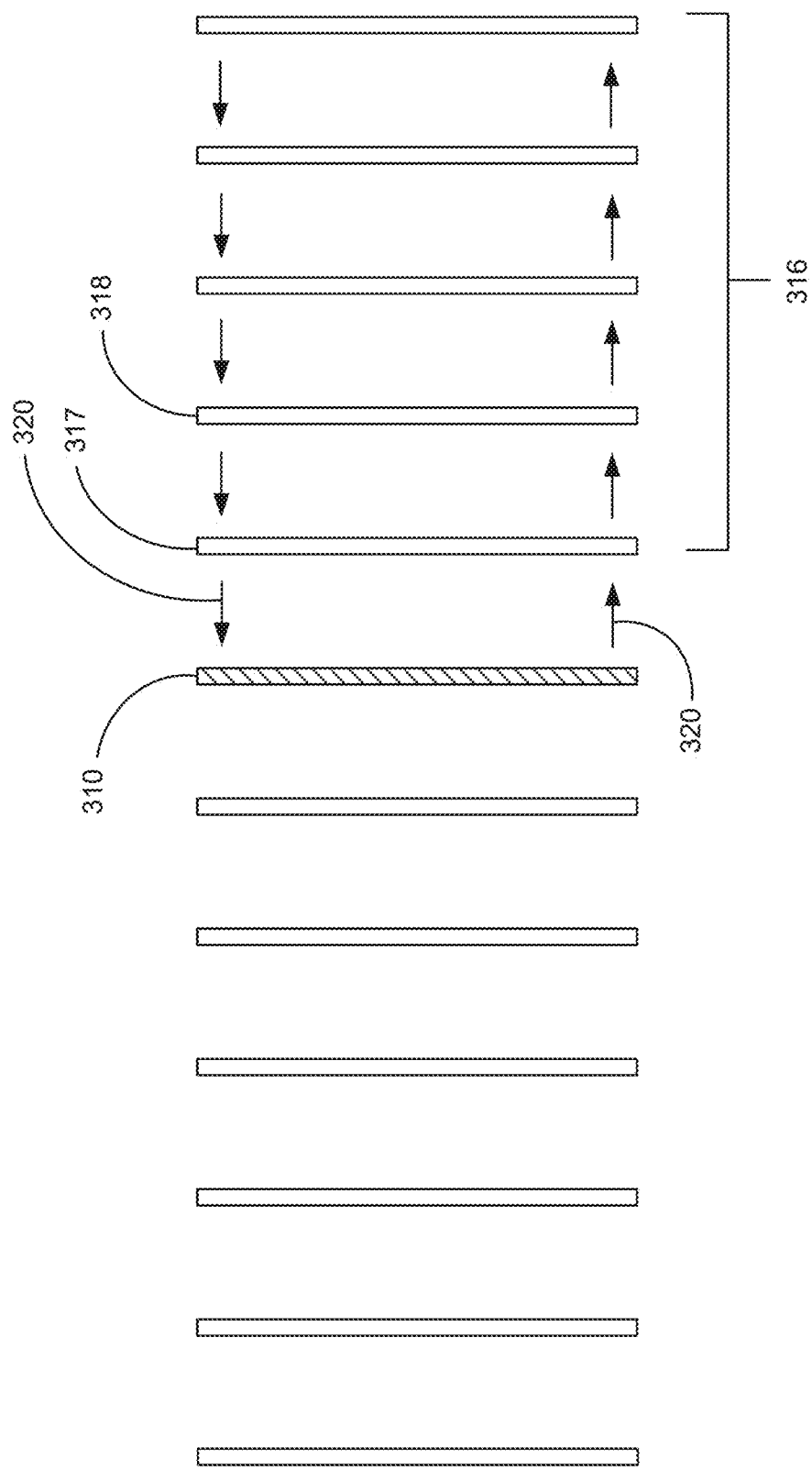
FIG. 5 illustrates a technique for generating a CDF for a set of video frames that occur after a current video frame, according to various embodiments of the present invention.

At step 270, the shot change detection application 112 calculates a CDF 350-3 for one or more video frames that occur after the current video frame 310. In some embodiments, the shot change detection application 112 calculates a CDF 350-3 for the five video frames 316 that occur after the current video frame 310, as shown in FIG. 5. Specifically, at step 270, the shot change detection application 112 performs steps 220 and 230 for each video frame included in the one or more video frames, with reference to the next video frame. For example, as shown in FIG. 5, the shot change detection application 112 could perform steps 220 and 230 for video frame 317 by performing motion estimation with reference to video frame 310. The shot change detection application 112 could further perform steps 220 and 230 for video frame 318 by performing motion estimation with reference to video frame 317, and so on until SAD values have been calculated for all five video frames 316. The shot change detection application 112 would then generate a histogram, a PDF 340-3, and then a CDF 350-3 based on the SAD values associated with all of the one or more video frames (e.g., the five next video frames 316).

Although the examples provided above implement five video frames in steps 260 and 270, in other embodiments, other numbers of video frames could be implemented. For example, the shot change detection application 112 could implement two video frames, three video frames, four video frames, six video frames, etc. to generate each CDF 350-2, 350-3 in steps 260 and 270.

Next, at step 280, the shot change detection application 112 compares CDF 350-1 associated with the current video frame 310 to CDF 350-2 and CDF 350-3 associated with the previous one or more video frames (e.g., video frames 314) and the next one or more video frames (e.g., video frames 316), respectively, to determine whether a shot change has occurred between the previous video frame 312 and the current video frame 310. In some embodiments, at step 280, the shot change detection application 112 determines whether a shot change has occurred by determining whether a SAD value that corresponds to a first probability in CDF 350-1 is greater than a SAD value that corresponds to a second probability in CDF 350-2 and/or is greater than a SAD value that corresponds to the second probability in CDF 350-3. If the SAD value that corresponds to the first probability in CDF 350-1 is greater than the SAD values that correspond to the second probability in CDF 350-2 and/or CDF 350-3, then the method 200 proceeds to step 290, where the shot change detection application 112 determines that a shot change has occurred. If the SAD value that corresponds to the first probability in CDF 350-1 is not greater than the SAD values that correspond to the second probability in CDF 350-2 and/or CDF 350-3, then the method 200 proceeds to step 292, where the shot change detection application 112 determines that a shot change has not occurred. The method 200 then returns to step 210.

Figure 6:
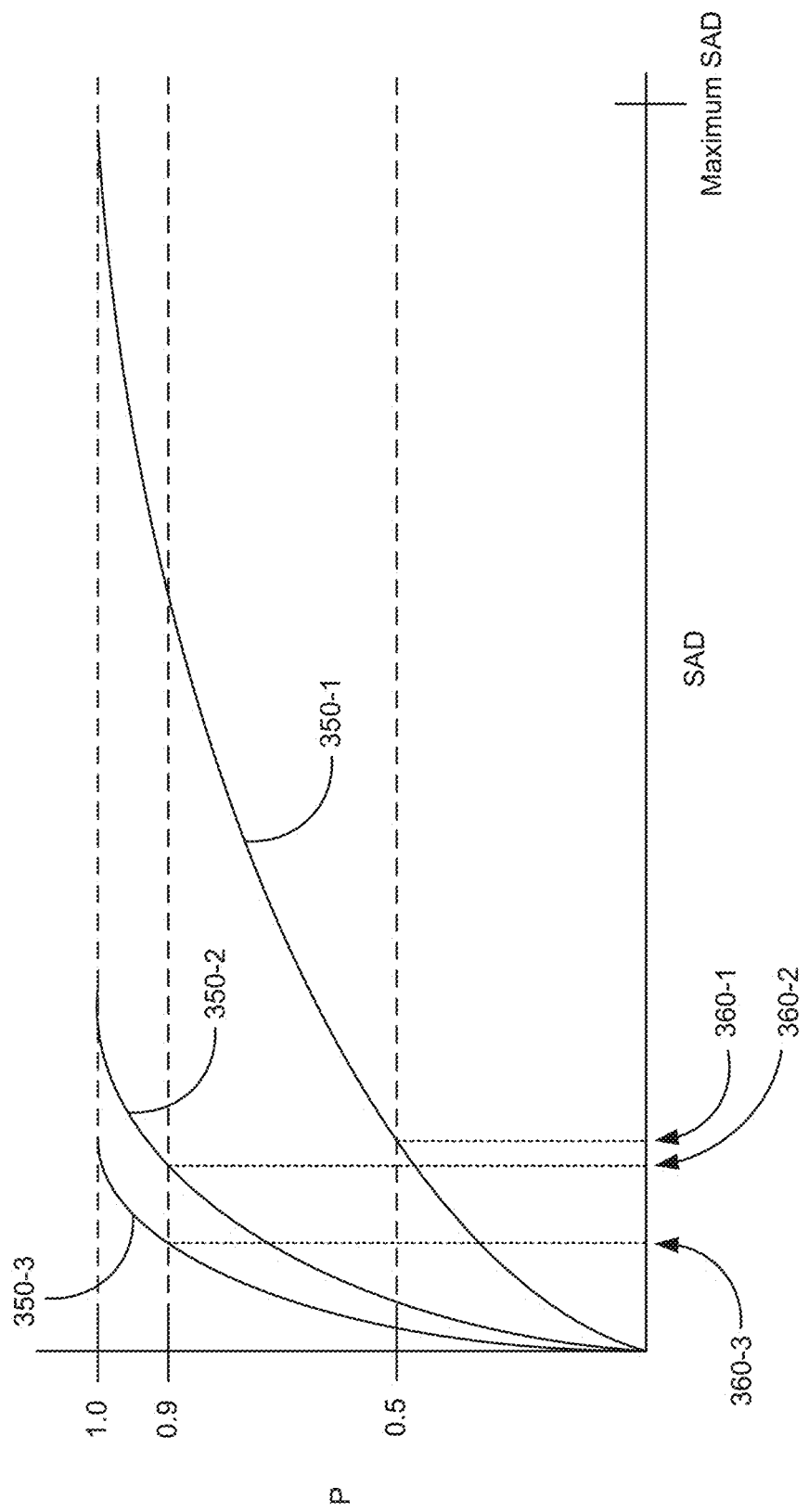
FIGS. 6 and 7 illustrate a technique for comparing cumulative distribution functions (CDFs) to detect a shot change in a video, according to various embodiments of the present invention.
Figure 7:
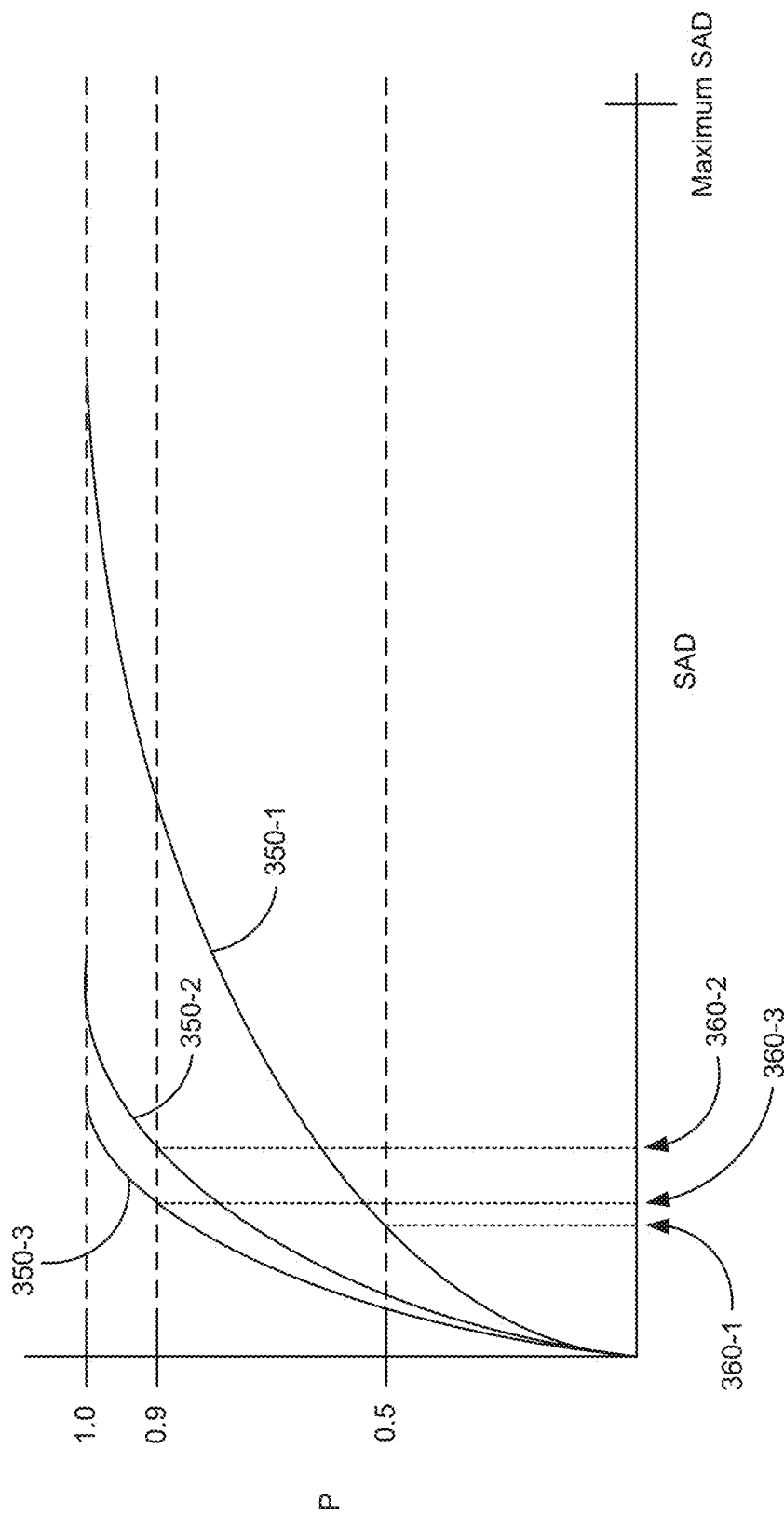

For example, as shown in FIG. 6, at step 280, the shot change detection application 112 could determine a SAD value 360-1 that corresponds to a 50% probability in CDF 350-1 and determine whether that SAD value is greater than SAD values 360-2, 360-3 that correspond to a 90% probability in CDF 350-2 and/or CDF 350-3. As shown in FIG. 6, because the SAD value 360-1 that corresponds to a 50% probability in CDF 350-1 is greater than the SAD values 360-2, 360-3 that correspond to a 90% probability in CDF 350-2 and CDF 350-3, the shot change detection application 112 would determine that a shot change has occurred. By contrast, as shown in the hypothetical set of CDFs 350 shown in FIG. 7, because the SAD value 360-1 that corresponds to a 50% probability in CDF 350-1 is not greater than the SAD values 360-2, 360-3 that correspond to a 90% probability in CDF 350-2 and CDF 350-3, the shot change detection application 112 would determine that a shot change has not occurred.

In some embodiments, after detecting that a shot change has occurred, the shot change detection application 112 ignores a fixed number of video frames around the shot change. For example, the shot change detection application 112 could ignore 10 to 20 video frames on either side of the shot change based on the assumption that there will be at least a minimum period of time between shot changes. Further, if the shot change detection application 112 detects shot changes with respect to two video frames that are within this minimum distance, the shot change detection application 112 could select the video frame that is more dissimilar to nearby video frames (e.g., based on comparing CDFs 350 associated with the video frames) and declare that video frame as the shot change.

Further, in some embodiments, in addition to comparing SAD value 360-1 associated with the current video frame 310 to SAD value 360-2 and/or SAD value 360-3 associated with the previous one or more video frames and the next one or more video frames, respectively, the shot change detection application 112 compares SAD value 360-1 to a minimum SAD value in order to determine whether a shot change has occurred. Comparing SAD value 360-1 associated with the current video frame 310 to a minimum SAD value helps to reduce false positives, for example, when detecting a shot change in a video scene that is relatively dark and/or has relatively low motion. In such scenes, SAD values for many or all pixel blocks 330 tend to be very small. Consequently, minor motion and/or noise within the video scene can result in a SAD value 360-1 that is greater than SAD value 360-2 and/or SAD value 360-3, even though a shot change has not occurred. Accordingly, in some embodiments, when SAD value 360-1 is greater than SAD value 360-2 and/or SAD value 360-3, but SAD value 360-1 is below the minimum SAD value, then the shot change detection application 112 does not detect a shot change. As an example, in embodiments that implement pixel blocks 330 having 32×32 pixels and 8-bit luminance values, a minimum SAD value of 800 could be implemented by the shot change detection application 112. Then, if SAD value 360-1 is less than 800, the shot change detection application 112 would not detect a shot change, regardless of the values of SAD value 360-2 and SAD value 360-3.

Although the above examples are discussed with respect to specific probabilities (i.e., 50% and 90%), any probabilities may be implemented to detect shot changes. For example, the probability implemented to select a SAD value from CDF 350-1 could be approximately 30% to approximately 70%, such as 40%, 50%, or 60%. Additionally, the probability implemented to select a SAD value from CDF 350-2 and/or 350-3 could be approximately 60% to approximately 95%, such as 70% or 80%. Any other probabilities may be selected within the scope of the embodiments.

In sum, a shot change detection application performs motion estimation on pixel blocks included in a current video frame and a previous video frame in order to calculate a plurality of differences values. The shot change detection application then generates a histogram based on the difference values calculated for the pixel blocks. Next, the shot change detection application 112 generates a cumulative distribution function (CDF) based on the histogram. The shot change detection application 112 then calculates differences values for one or more previous video frames and one or more subsequent videos frames. Based on the difference values, the shot change detection application 112 generates two additional histograms—one histogram for the one or more previous video frames and one histogram for the one or more subsequent video frames. Then, the shot change detection application generates a different CDF for each of the additional histograms. Finally, the CDF associated with the current video frame is compared to the CDFs associated with the one or more previous video frames and the one or more subsequent video frames in order to determine whether a shot change exists between the current video frame and the previous video frame.

At least one advantage of the disclosed techniques is that shot changes can be detected deterministically, in both a forward direction and reverse direction, with respect to a particular sequence of video frames. Additionally, the techniques described herein are able to more precisely detect shot changes that occur between video frames having similar luminance and/or color values, but different spatial characteristics. Further, the techniques described herein are able to avoid false positives that may otherwise occur due to sudden lighting changes that occur within a single, continuous shot.

1. In some embodiments, a non-transitory computer-readable storage medium including instructions that, when executed by a processor, cause the processor to perform the steps of: calculating a first plurality of difference values for pixel blocks included in a first video frame and a second video frame; calculating a first cumulative distribution function (CDF) based on the first plurality of difference values; calculating a second plurality of difference values for pixel blocks included in a first plurality of video frames that is contiguous with the first video frame; calculating a second CDF based on the second plurality of difference values; and comparing the first CDF to the second CDF to detect a shot change.

2. The non-transitory computer-readable storage medium of clause 1, wherein the plurality of difference values comprise sum of absolute difference (SAD) values.

3. The non-transitory computer-readable storage medium of any of clauses 1-2, further comprising applying a blur filter to a first unprocessed video frame and a second unprocessed video frame to generate the first video frame and the second video frame.

4. The non-transitory computer-readable storage medium of any of clauses 1-3, wherein calculating the first plurality of difference values for the pixel blocks included in the first video frame and the second video frame comprises: performing motion estimation for pixel blocks included in the first video frame with reference to the second video frame to determine a first subset of difference values included in the first plurality of difference values; and performing motion estimation for pixel blocks included in the second video frame with reference to the first video frame to determine a second subset of difference values included in the first plurality of difference values.

5. The non-transitory computer-readable storage medium of any of clauses 1-4, wherein calculating the second plurality of difference values for pixel blocks included in the first plurality of video frames comprises, for each video frame included in the first plurality of video frames, performing motion estimation for pixel blocks included in the video frame with reference to at least one adjacent video frame to determine a subset of difference values included in the second plurality of difference values.

6. The non-transitory computer-readable storage medium of any of clauses 1-5, wherein comparing the first CDF to the second CDF comprises: determining a first difference value that corresponds to a first CDF probability associated with the first CDF; determining a second difference value that corresponds to a second CDF threshold of the second CDF, wherein the first CDF probability is lower than the second CDF probability; determining that the first difference value is greater than the second difference value, and, in response, determining that a shot change occurs between the first video frame and the second video frame.

7. The non-transitory computer-readable storage medium of any of clauses 1-6, further comprising: calculating a third plurality of difference values for pixel blocks included in a second plurality of video frames that is contiguous with the first video frame, wherein the first plurality of video frames occur temporally before the first video frame, and the second plurality of video frames occur temporally after the first video frame; and calculating a third CDF based on the third plurality of difference values, wherein the shot change is detected by comparing the first CDF to the second CDF and to the third CDF.

8. The non-transitory computer-readable storage medium of any of clauses 1-7: wherein calculating the second plurality of difference values for pixel blocks included in the first plurality of video frames comprises, for each video frame included in the first plurality of video frames, performing motion estimation for pixel blocks included in the video frame with reference to at least one adjacent video frame to determine a first plurality of sum of absolute difference (SAD) values included in the second plurality of difference values, and wherein calculating the third plurality of difference values for pixel blocks included in the second plurality of video frames comprises, for each video frame included in the second plurality of video frames, performing motion estimation for pixel blocks included in the video frame with reference to at least one adjacent video frame to determine a second plurality of SAD values included in the third plurality of difference values.

9. The non-transitory computer-readable storage medium of any of clauses 1-8, wherein comparing the first CDF to the second CDF and to the third CDF comprises: determining a first SAD value that corresponds to a first CDF probability associated with the first CDF; determining a second SAD value that corresponds to a second CDF probability associated with the second CDF; determining a third SAD value that corresponds to a third CDF probability associated with the third CDF, wherein the first CDF probability is lower than the second CDF probability and lower than the third CDF probability; and determining that the first SAD value is greater than at least one of the second SAD value and the third SAD value.

10. A method, comprising: calculating a first plurality of difference values for pixel blocks included in a first video frame and a second video frame; calculating a first cumulative distribution function (CDF) based on the first plurality of difference values; calculating a second plurality of difference values for pixel blocks included in a first plurality of video frames that is contiguous with the first video frame, wherein each of the first plurality of difference values and the second plurality of differences values comprises sum of absolute difference (SAD) values; calculating a second CDF based on the second plurality of difference values; and comparing the first CDF to the second CDF to detect a shot change.

11. The method of clause 10, further comprising applying a blur filter to a first unprocessed video frame and a second unprocessed video frame to generate the first video frame and the second video frame.

12. The method of any of clauses 10-11, wherein calculating the first plurality of difference values for the pixel blocks included in the first video frame and the second video frame comprises: performing motion estimation for pixel blocks included in the first video frame with reference to the second video frame to determine a first subset of difference values included in the first plurality of difference values; and performing motion estimation for pixel blocks included in the second video frame with reference to the first video frame to determine a second subset of difference values included in the first plurality of difference values.

13. The method of any of clauses 10-12, wherein calculating the second plurality of difference values for pixel blocks included in the first plurality of video frames comprises, for each video frame included in the first plurality of video frames, performing motion estimation for pixel blocks included in the video frame with reference to at least one adjacent video frame to determine a subset of difference values included in the second plurality of difference values.

14. The method of any of clauses 10-13, further comprising: calculating a third plurality of difference values for pixel blocks included in a second plurality of video frames that is contiguous with the first video frame, wherein the first plurality of video frames occur temporally before the first video frame, and the second plurality of video frames occur temporally after the first video frame; and calculating a third CDF based on the third plurality of difference values, wherein the shot change is detected by comparing the first CDF to the second CDF and to the third CDF.

15. The method of any of clauses 10-14: wherein calculating the second plurality of difference values for pixel blocks included in the first plurality of video frames comprises, for each video frame included in the first plurality of video frames, performing motion estimation for pixel blocks included in the video frame with reference to at least one adjacent video frame to determine a first plurality of sum of absolute difference (SAD) values included in the second plurality of difference values, and wherein calculating the third plurality of difference values for pixel blocks included in the second plurality of video frames comprises, for each video frame included in the second plurality of video frames, performing motion estimation for pixel blocks included in the video frame with reference to at least one adjacent video frame to determine a second plurality of SAD values included in the third plurality of difference values.

16. The method of any of clauses 10-15, wherein comparing the first CDF to the second CDF and to the third CDF comprises: determining a first SAD value that corresponds to a first CDF probability associated with the first CDF; determining a second SAD value that corresponds to a second CDF probability associated with the second CDF; determining a third SAD value that corresponds to a third CDF probability associated with the third CDF, wherein the first CDF probability is lower than the second CDF probability and lower than the third CDF probability; determining that the first SAD value is greater than at least one of the second SAD value and the third SAD value; and, in response, determining that a shot change occurs between the first video frame and the second video frame.

17. The method of any of clauses 10-16, wherein comparing the first CDF to the second CDF comprises: determining a first difference value that corresponds to a first CDF probability associated with the first CDF; determining a second difference value that corresponds to a second CDF probability associated with the second CDF, wherein the first CDF probability is lower than the second CDF probability; determining that the second difference value is less than a minimum difference value; and determining that the first difference value is greater than the minimum difference value.

18. The method of any of clauses 10-17, wherein calculating the first CDF comprises: generating a first histogram based on the first plurality of difference values; scaling the first histogram based on a first number of difference values included in the first plurality of difference values to generate a first probability density function (PDF); and integrating the first PDF to generate the first CDF.

19. The method of any of clauses 10-18, wherein calculating the second CDF comprises: generating a second histogram based on the second plurality of difference values, wherein the second plurality of difference values are calculated based on a plurality of video frames included in the first plurality of video frames; scaling the second histogram based on a second number of difference values included in the second plurality of difference values to generate a second PDF; and integrating the second PDF to generate the second CDF.

20. A computing device, comprising: a memory storing a shot change detection application; and a processor that is coupled to the memory and, when executing the shot change detection application, is configured to: calculate a first plurality of difference values for pixel blocks included in a first video frame and a second video frame; calculate a first cumulative distribution function (CDF) based on the first plurality of difference values; calculate a second plurality of difference values for pixel blocks included in a first plurality of video frames that is contiguous with the first video frame; calculate a second CDF based on the second plurality of difference values; calculate a third plurality of difference values for pixel blocks included in a second plurality of video frames that is contiguous with the first video frame, wherein the first plurality of video frames occur temporally before the first video frame, and the second plurality of video frames occur temporally after the first video frame; calculate a third CDF based on the third plurality of difference values; and compare the first CDF to the second CDF and to the third CDF to detect a shot change.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
   calculating a first plurality of difference values for pixel blocks included in a first video frame and a second video frame;
   calculating a first cumulative distribution function (CDF) based on the first plurality of difference values;
   calculating a second plurality of difference values for a plurality of pairs of contiguous video frames by calculating, for each pair of contiguous video frames in the plurality of pairs of contiguous video frames, difference values for pixel blocks included in the pair of contiguous video frames;

calculating a second CDF based on the second plurality of difference values; and comparing the first CDF to the second CDF to detect a shot change.

2. The non-transitory computer-readable storage medium of claim 1, wherein the first plurality of difference values comprise sum of absolute difference (SAD) values.

3. The non-transitory computer-readable storage medium of claim 1, further comprising applying a blur filter to a first unprocessed video frame and a second unprocessed video frame to generate the first video frame and the second video frame.

4. The non-transitory computer-readable storage medium of claim 1, wherein calculating the first plurality of difference values for the pixel blocks included in the first video frame and the second video frame comprises:

performing motion estimation for pixel blocks included in the first video frame with reference to the second video frame to determine a first subset of difference values included in the first plurality of difference values; and performing motion estimation for pixel blocks included in the second video frame with reference to the first video frame to determine a second subset of difference values included in the first plurality of difference values.

5. The non-transitory computer-readable storage medium of claim 4, wherein calculating the second plurality of difference values for pixel blocks included in the first plurality of video frames comprises, for each pair of contiguous video frames included in the plurality of pairs of contiguous video frames, performing motion estimation for pixel blocks included in the pair of contiguous video frames with reference to at least one adjacent video frame to determine a subset of difference values included in the second plurality of difference values.

6. The non-transitory computer-readable storage medium of claim 1, wherein comparing the first CDF to the second CDF comprises:

determining a first difference value that corresponds to a first CDF probability associated with the first CDF;

determining a second difference value that corresponds to a second CDF threshold of the second CDF, wherein the first CDF probability is lower than the second CDF probability;

determining that the first difference value is greater than the second difference value, and in response, determining that a shot change occurs between the first video frame and the second video frame.

7. The non-transitory computer-readable storage medium of claim 1, further comprising:

calculating a third plurality of difference values for pixel blocks included in a second plurality of pairs of contiguous video frames, wherein the plurality of pairs of contiguous video frames occur temporally before the first video frame, and the second plurality of pairs of contiguous video frames occur temporally after the first video frame; and calculating a third CDF based on the third plurality of difference values, wherein the shot change is detected by comparing the first CDF to the second CDF and to the third CDF.

8. The non-transitory computer-readable storage medium of claim 7:

wherein calculating the second plurality of difference values for pixel blocks included in the plurality of pairs of contiguous video frames comprises, for each pair of contiguous video frames included in the plurality of pairs of contiguous video frames, performing motion estimation for pixel blocks included in the pair of contiguous video frames with reference to at least one adjacent video frame to determine a first plurality of sum of absolute difference (SAD) values included in the second plurality of difference values, and wherein calculating the third plurality of difference values for pixel blocks included in the second plurality of pairs of contiguous video frames comprises, for each pair of contiguous video frames included in the second plurality of pairs of contiguous video frames, performing motion estimation for pixel blocks included in the pair of contiguous video frames with reference to at least one adjacent video frame to determine a second plurality of SAD values included in the third plurality of difference values.

9. The non-transitory computer-readable storage medium of claim 7, wherein comparing the first CDF to the second CDF and to the third CDF comprises:

determining a first SAD value that corresponds to a first CDF probability associated with the first CDF;

determining a second SAD value that corresponds to a second CDF probability associated with the second CDF;

determining a third SAD value that corresponds to a third CDF probability associated with the third CDF, wherein the first CDF probability is lower than the second CDF probability and lower than the third CDF probability; and determining that the first SAD value is greater than at least one of the second SAD value and the third SAD value.

10. A method, comprising:

calculating a first plurality of difference values for pixel blocks included in a first video frame and a second video frame;

calculating a first cumulative distribution function (CDF) based on the first plurality of difference values;

calculating a second plurality of difference values for a plurality of pairs of contiguous video frames by calculating, for each pair of contiguous video frames in the plurality of pairs of contiguous video frames, difference values for pixel blocks included in the pair of contiguous video frames, wherein each of the first plurality of difference values and the second plurality of differences values comprises sum of absolute difference (SAD) values;

calculating a second CDF based on the second plurality of difference values; and comparing the first CDF to the second CDF to detect a shot change.

11. The method of claim 10, further comprising applying a blur filter to a first unprocessed video frame and a second unprocessed video frame to generate the first video frame and the second video frame.

12. The method of claim 11, wherein calculating the first plurality of difference values for the pixel blocks included in the first video frame and the second video frame comprises:

performing motion estimation for pixel blocks included in the first video frame with reference to the second video frame to determine a first subset of difference values included in the first plurality of difference values; and performing motion estimation for pixel blocks included in the second video frame with reference to the first video frame to determine a second subset of difference values included in the first plurality of difference values.

13. The method of claim 12, wherein calculating the second plurality of difference values for pixel blocks included in the first plurality of video frames comprises, for each pair of contiguous video frames included in the plurality of pairs of contiguous video frames, performing motion estimation for pixel blocks included in the pair of contiguous video frames with reference to at least one adjacent video frame to determine a subset of difference values included in the second plurality of difference values.

14. The method of claim 10, further comprising:
calculating a third plurality of difference values for pixel blocks included in a second plurality of pairs of contiguous video frames, wherein the plurality of pairs of contiguous video frames occur temporally before the first video frame, and the second plurality of pairs of contiguous video frames occur temporally after the first video frame; and
calculating a third CDF based on the third plurality of difference values,
wherein the shot change is detected by comparing the first CDF to the second CDF and to the third CDF.

15. The method of claim 14:
wherein calculating the second plurality of difference values for pixel blocks included in the plurality of pairs of contiguous video frames comprises, for each pair of contiguous video frames included in the plurality of pairs of contiguous video frames, performing motion estimation for pixel blocks included in the pair of contiguous video frames with reference to at least one adjacent video frame to determine a first plurality of sum of absolute difference (SAD) values included in the second plurality of difference values, and
wherein calculating the third plurality of difference values for pixel blocks included in the second plurality of pairs of contiguous video frames comprises, for each pair of contiguous video frames included in the second plurality of pairs of contiguous video frames, performing motion estimation for pixel blocks included in the pair of contiguous video frames with reference to at least one adjacent video frame to determine a second plurality of SAD values included in the third plurality of difference values.

16. The method of claim 14, wherein comparing the first CDF to the second CDF and to the third CDF comprises:
determining a first SAD value that corresponds to a first CDF probability associated with the first CDF;
determining a second SAD value that corresponds to a second CDF probability associated with the second CDF;
determining a third SAD value that corresponds to a third CDF probability associated with the third CDF, wherein the first CDF probability is lower than the second CDF probability and lower than the third CDF probability;
determining that the first SAD value is greater than at least one of the second SAD value and the third SAD value; and
in response, determining that a shot change occurs between the first video frame and the second video frame.

17. The method of claim 10, wherein comparing the first CDF to the second CDF comprises:

determining a first difference value that corresponds to a first CDF probability associated with the first CDF;
determining a second difference value that corresponds to a second CDF probability associated with the second CDF, wherein the first CDF probability is lower than the second CDF probability;
determining that the second difference value is less than a minimum difference value; and
determining that the first difference value is greater than the minimum difference value.

18. The method of claim 10, wherein calculating the first CDF comprises:
generating a first histogram based on the first plurality of difference values;
scaling the first histogram based on a first number of difference values included in the first plurality of difference values to generate a first probability density function (PDF); and
integrating the first PDF to generate the first CDF.

19. The method of claim 18, wherein calculating the second CDF comprises:
generating a second histogram based on the second plurality of difference values, wherein the second plurality of difference values are calculated based on a plurality of video frames included in the first plurality of video frames;
scaling the second histogram based on a second number of difference values included in the second plurality of difference values to generate a second PDF; and
integrating the second PDF to generate the second CDF.

20. A computing device, comprising:
a memory storing a shot change detection application; and
a processor that is coupled to the memory and, when executing the shot change detection application, is configured to:
calculate a first plurality of difference values for pixel blocks included in a first video frame and a second video frame;
calculate a first cumulative distribution function (CDF) based on the first plurality of difference values;
calculate a second plurality of difference values for a plurality of pairs of contiguous video frames by calculating, for each pair of contiguous video frames in the plurality of pairs of contiguous video frames, difference values for pixel blocks included in the pair of contiguous video frames;
calculate a second CDF based on the second plurality of difference values;
calculate a third plurality of difference values for pixel blocks included in a second plurality of video frames that is contiguous with the first video frame, wherein the first plurality of video frames occur temporally before the first video frame, and the second plurality of video frames occur temporally after the first video frame;
calculate a third CDF based on the third plurality of difference values; and
compare the first CDF to the second CDF and to the third CDF to detect a shot change.

* * * * *